United States Patent
Freudendahl

[11] Patent Number: 5,279,320
[45] Date of Patent: Jan. 18, 1994

[54] GATE VALVE

[75] Inventor: Erling A. Freudendahl, Galten, Denmark

[73] Assignee: AVK Maskinfabrik A/S, Denmark

[21] Appl. No.: 835,434

[22] PCT Filed: Jun. 19, 1990

[86] PCT No.: PCT/DK90/00158
§ 371 Date: Feb. 19, 1992
§ 102(e) Date: Feb. 19, 1992

[87] PCT Pub. No.: WO90/15946
PCT Pub. Date: Dec. 27, 1990

[30] Foreign Application Priority Data

Jun. 19, 1989 [DK] Denmark .................. 3028/89

[51] Int. Cl.⁵ ............................................ F16L 55/18
[52] U.S. Cl. ...................................... 137/15; 137/375; 251/267; 251/368
[58] Field of Search ................. 137/375, 15; 251/368, 251/266, 267

[56] References Cited

U.S. PATENT DOCUMENTS
4,532,957 8/1985 Battle et al. ..................... 137/375

FOREIGN PATENT DOCUMENTS
0146112 12/1984 Fed. Rep. of Germany.

Primary Examiner—A. Michael Chambers
Attorney, Agent, or Firm—Scully, Scott, Murphy & Presser

[57] ABSTRACT

A gate valve comprises a valve body (1) and a gate displaceably arranged inside said valve body transverse to the flow direction, said gate being provided on each side with a guide groove (14) guided by means of a mating guide rail formed on each side of the valve body (1). The gate (13) comprises a gate core (16) coated with a polymeric material, preferably an elastomer, which in the sealing surface areas (17, 18) of the gate (13) sealingly abuts the corresponding seat surfaces (19, 20) of the valve body (1) in the closed position of the gate. At least the guide grooves (14, 44) are coated with a harder and more wear-resisting polymeric material than the remaining portion of the gate, and the two coatings are moulded such that a molecular interbinding exists between said coatings in the transition areas therebetween.

8 Claims, 4 Drawing Sheets

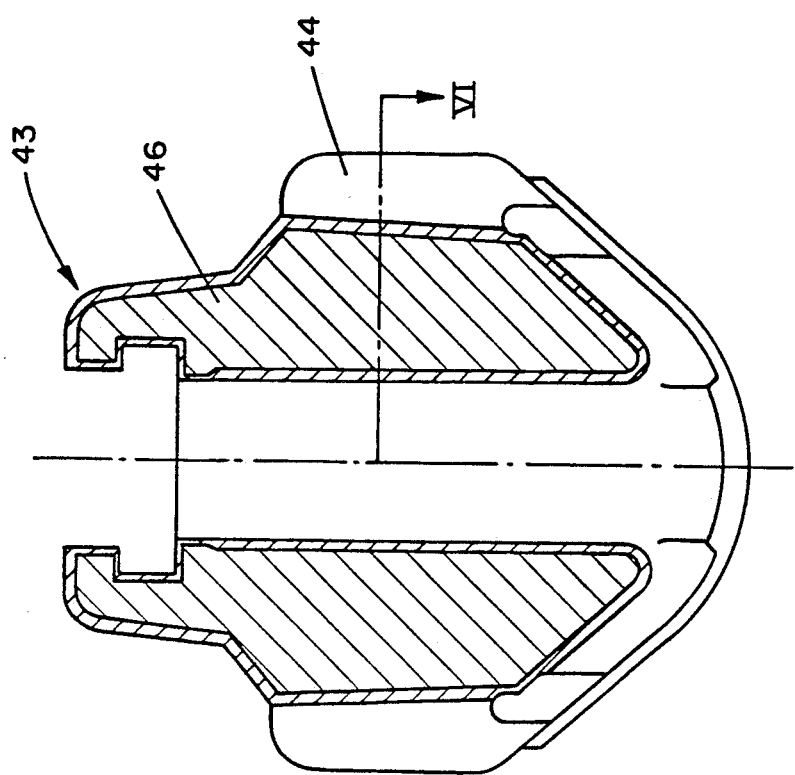
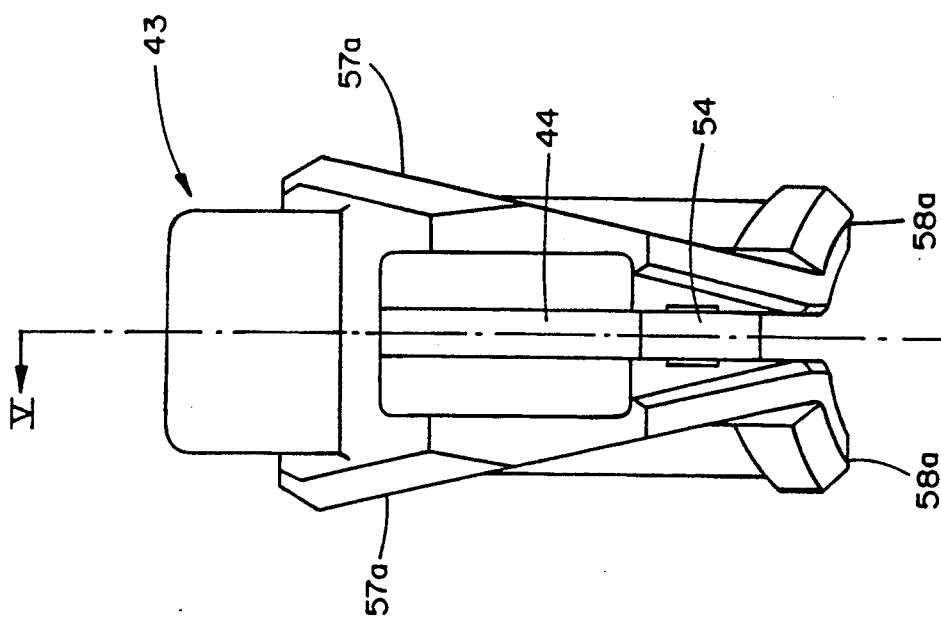

GATE VALVE

TECHNICAL FIELD

The invention relates to a gate valve comprising a valve body and a gate displaceably arranged inside said valve body transverse to the flow direction, said gate being provided on each side with a guide groove guided by means of a mating guide rail formed on each side of the valve body, whereby the gate comprises a gate core provided with a coating thereon comprising a softer moulded polymeric material, preferably an elastomer, which in the sealing surface areas of the gate sealingly abuts the corresponding seat surfaces of the valve body in the closed position of the gate and a harder and more wear-resisting polymeric material provided at least in the guide grooves.

BACKGROUND ART

Gate valves of the above type are known which comprise a gate coated on the outside with rubber except for the guide areas. The gate is often made of cast iron with the result that corrosion problems may arise. As a consequence thereof gates entirely coated with rubber are commonly used today. However, a disadvantage of coating the guide areas with soft rubber is an increased friction and wearing off of said guide areas in some situations, such as when the valve is used for extremely high pressures. The increased friction causes in turn an increase in the stem force for opening and closing the valve.

U.S. Pat. No. 4,532,957 discloses furthermore a gate valve with a gate comprising a gate core. On each side the gate core comprises a groove wherein a plastic insert of a harder material is placed. The plastic insert forms a guide groove for mating guide rails inside the valve body. The entire outer surface of the valve gate except for the guide grooves is coated with a softer rubber material.

The manufacture of such a gate involves the steps of first manufacturing the inserts in a separate mould followed by placing the inserts in the grooves inside the gate core, said gate core subsequently being coated with rubber in a second mould.

European printed accepted specification No. 01 46 112 discloses furthermore a valve gate coated on the entire outer surface with a softer rubber-elastic material and provided with a U-shaped harder plastic insert on each side. The plastic insert forms a guide groove for guide rails in the body and is embedded in the rubber-elastic material, i.e. it is encapsulated by said material except for in the guide groove. Also the manufacture of such a gate involves the steps of manufacturing the inserts in a separate mould followed by a placing thereof together with the gate core in a second mould so as to provide the rubber coating.

DISCLOSURE OF INVENTION

The object of the invention is to provide a gate valve of the above type and comprising a corrosion-protected gate which possesses excellent sliding properties in the guide areas, and the manufacture of which is simple and inexpensive.

The gate valve according to the invention is characterised in that the harder material is moulded at least in the guide grooves, in that the softer and the harder polymeric materials are molecularly compatible and molecularly interconnected in their transition areas. As a result, the gate can be manufactured in a simple and inexpensive manner by means of only one mould while achieving an excellent protection against corrosion and good sliding properties in the guide areas. A further advantage is simultaneously achieved because the risk has been eliminated of the two coating materials being separated in service of the valve. Such a separation of the two coating materials might otherwise cause a malfunctioning of the valve and a corrosion of the gate core.

According to the invention a portion with the harder material may be provided in the sealing surface areas of the gate, preferably adjacent the bottom of said gate, and the surface of the harder material may be recessed, preferably by 2 to 4 mm, relative to the surface of the surrounding softer material. As a result, the gate is stopped almost instantaneously when the valve is being closed, and in addition said stop is perceptible when the valve is being closed manually with the effect that a too tight closing of the valve is avoided which might otherwise destroy the sealing materials.

Another advantage is according to the invention obtained in relation to manufacture by the areas with the harder material being continuous.

Moreover according to the invention the coating materials may be elastomers, preferably a hard and a soft nitrile rubber (NBR). Such an embodiment is according to the invention preferred at present. Other combinations may, however, also apply, such as hard and soft SBR and EPDM.

The invention relates furthermore to a method for the manufacture of a gate for a gate valve of the above type.

The method according to the invention is characterised by comprising the steps of placing the gate core (16, 46) in a mould subsequently being closed, injecting the harder material (21) into the mould cavity through inlets in the portion corresponding to the guide grooves (14, 44) of the gate, injecting the softer material into the mould cavity, opening the mould and removing the gate valve (13, 43).

According to a preferred example of the method according to the invention the softer material is injected with a time delay, preferably of 2 to 3 sec., relative to the injection of the harder material.

BRIEF DESCRIPTION OF DRAWINGS

The invention is described in greater detail below with reference to the accompanying drawing, in which FIG. 4 is a side view of a gate modified relative to the gate of FIGS. 1 and 2 and to be used in the valve body of FIGS. 1 and 2, FIG. 5 is a sectional view taken along the line V—V of FIG. 4.

BEST MODE FOR CARRYING OUT THE INVENTION

Figure 1:
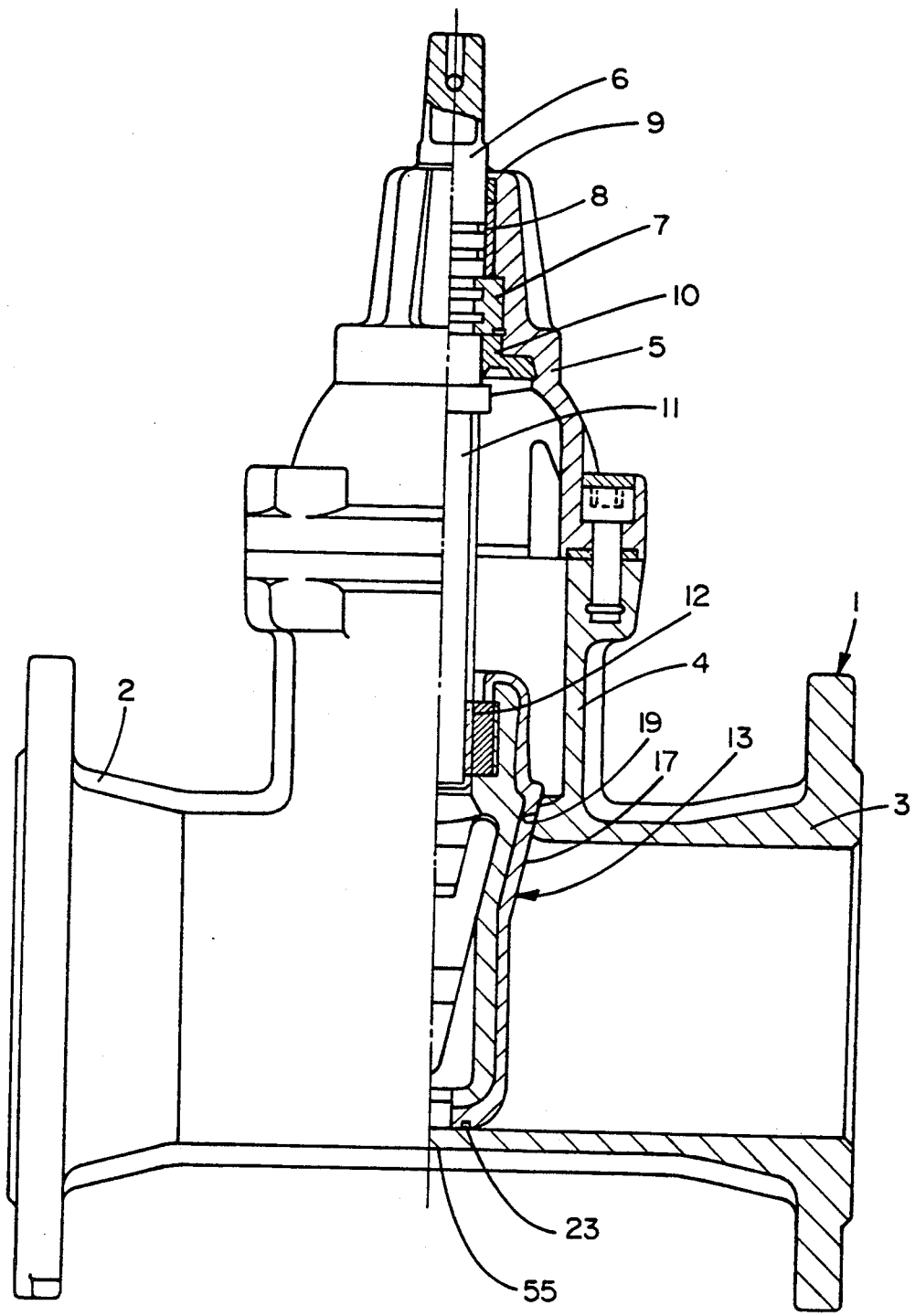
FIG. 1 is a side view combined with a longitudinal view of a gate valve according to the invention, the gate associated with the valve being shown in its closed position.
Figure 2:
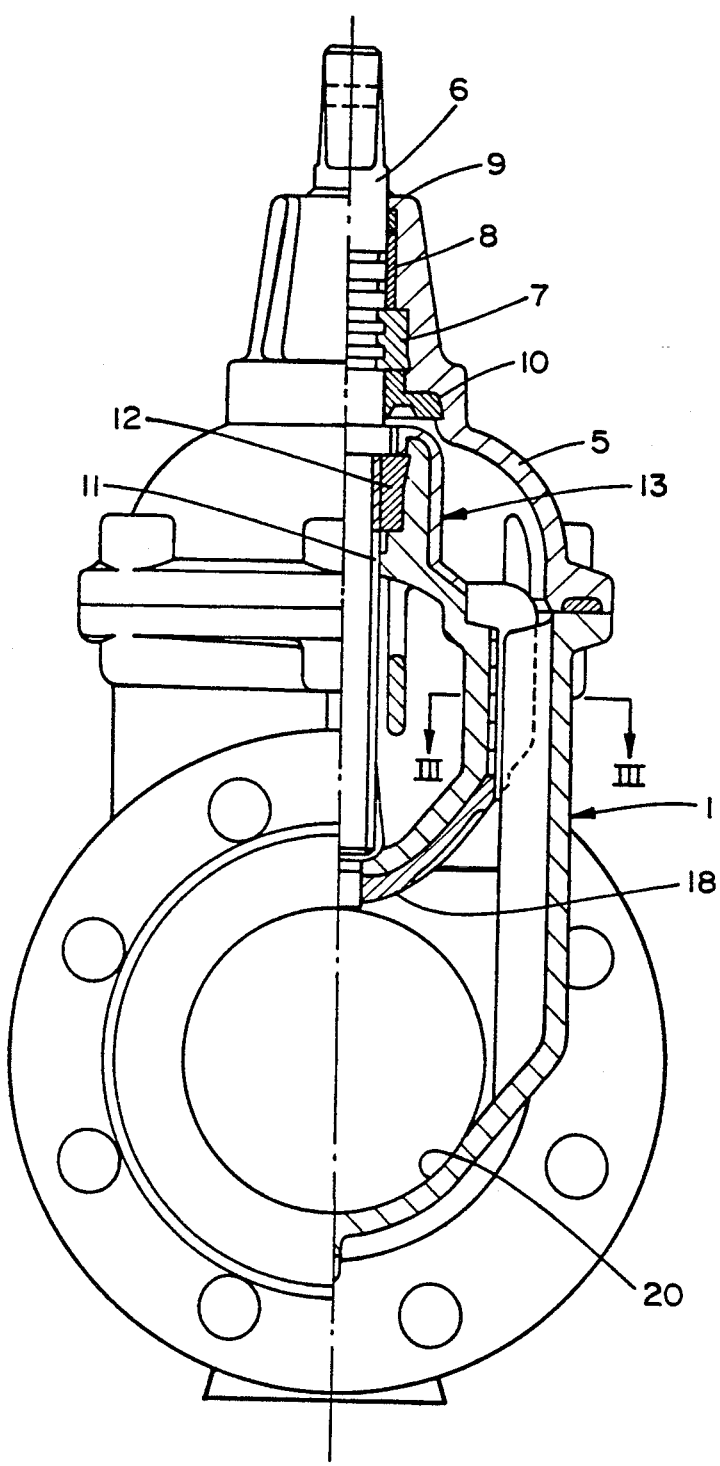
FIG. 2 is an end view combined with a cross-sectional view of the valve of FIG. 1 in its completely opened position, said Figure showing how a gate associated with the valve is displaceably guided in the valve body.
Figure 7:
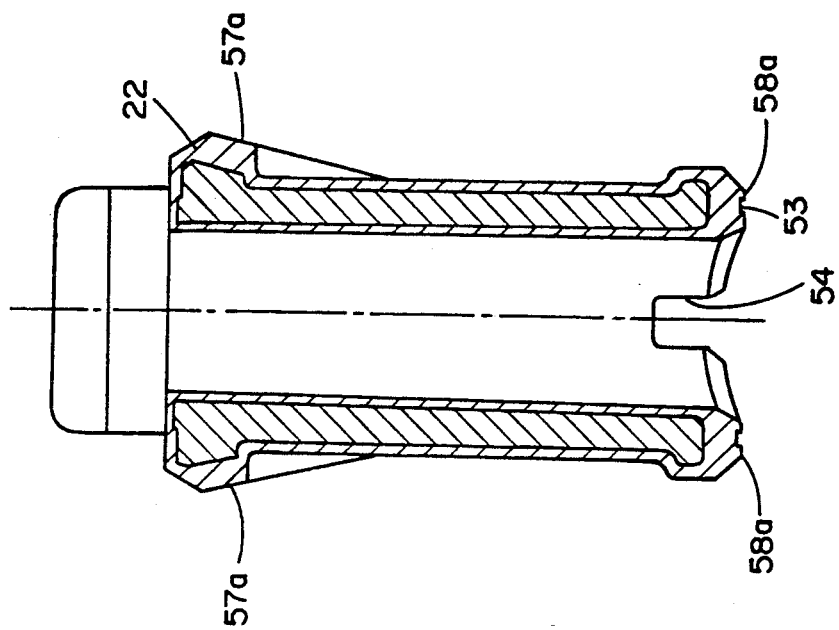
FIG. 7 is a sectional view through the gate taken along the line VII—VII of FIG. 6.
Figure 6:
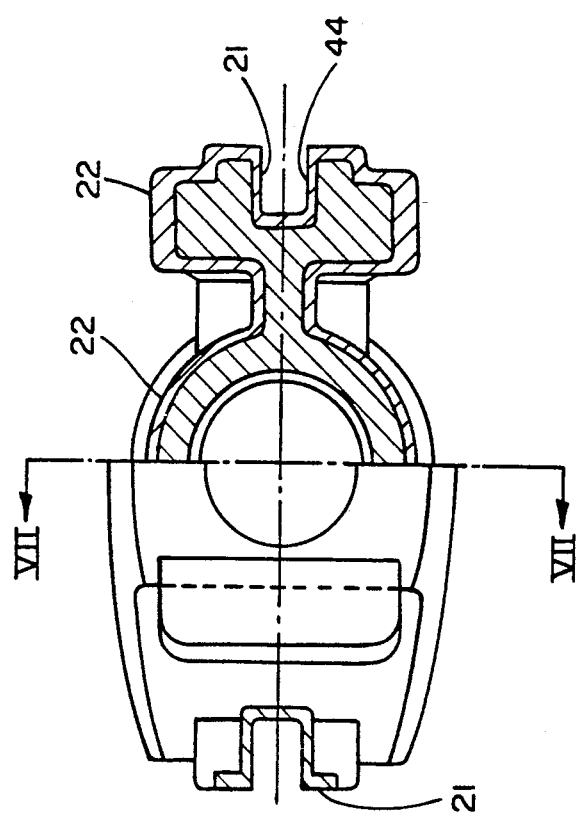
FIG. 6 is a top view of the gate modified in FIGS. 4 and 5 and taken along the line VI—VI of FIG. 5.

The inventive gate valve of FIGS. 1 and 2 comprises a substantially T-shaped valve body, said valve body including an inlet portion 2 aligned with an outlet portion 3, as well as a branch portion 4 perpendicular to said inlet and outlet portions. A bonnet 5 is bolted onto the branch portion, a stem 6 being rotatably mounted in said bonnet. The stem 6 is secured against axial displacement by means of a ring 7 and is guided with respect to rotation by means of a journal bearing 8. Sealings 9, 10 are provided between the stem 6 and the bonnet 5, said sealings both preventing impurities from entering the bearing 8 and preventing fluid from flowing into said bearing so as to leave the valve. A means not shown for rotating the stem can be secured at the upper end of said stem 6, said upper end projecting from the bonnet 5. The stem comprises a threaded portion 11 extending into the branch portion 4 of the valve body 1. A nut 12 engages the threaded portion, said nut being arranged at the upper end of a valve gate 13 such that it is secured against rotation.

Figure 3:
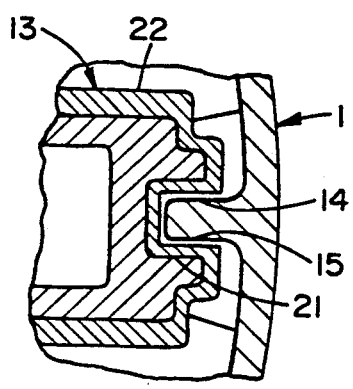
FIG. 3 is a partially sectional view taken along the line III—III of FIG. 2.

The valve gate comprises a guide groove 14 in each side, cf. in particular FIGS. 2 and 3, said guide groove being guided by means of a mating guide rail 15 shaped on each side of the valve body 1. The gate is raised and lowered by the stem being rotated in one or the opposite direction. The gate 13 comprises a gate core 16 coated on the outside with a polymeric material, preferably an elastomer. The coating is made of a comparatively hard and wear-resisting material 21 at least in the guide grooves 14. For the most part, including the sealing areas 17, 18 sealing against mating seat surfaces 19, 20 in the body, the gate is made of a comparatively soft material 22. The sealing areas 17, 18 of the gate comprise the axial sealing areas 17 provided in the upper portion of the gate and the radial sealing areas 18 provided in the lower portion of said gate. When the gate 13 is in the closed position, cf. FIG. 1, the axial sealing areas 17 co-operate sealingly with mating axial seat surfaces 20 in the upper portion of the body and the radial sealing areas 18 co-operate with mating radial seat surfaces 20 in the lower portion of the body. Accordingly, these coating portions of the gate are advantageously made of a relatively soft material 22. According to the invention it is advantageous when the coating of the guide grooves 14 of the gate co-operating with the guide rails 15 of the body is made of a comparatively harder material and more wear-resisting material 21, whereby a low frictional resistance and consequently a low stem force for displacing the gate is obtained in addition to a long life of said gate.

The two coatings, viz. the coating of the hard material 21 and the coating of the soft material 22, are produced by moulding said two materials in a mould, the soft material, however, preferably being injected with a time delay of preferably 2 to 3 sec. relative to the injection of the hard material. The use of rubber materials renders it furthermore possible to mould the hard material in a first mould and subsequently—prior to the vulcanization of the material—to transfer the core and the material moulded thereon to a second mould in which the soft material is moulded. Subsequently, the vulcanization of the two materials is completed while a molecular interbinding is obtained. The two polymeric materials 21, 22 are preferably elastomers and selected such that they are molecularly compatible, i.e. a molecular interbinding exists in the transition areas therebetween. With respect to the latter, it is particularly advantageous that the two materials are of the same type, such as for instance of hard and soft, respectively, nitrile rubber (NBR), whereby a total molecular interbinding of the materials is obtained in the transition areas therebetween. In addition to two elastomeric materials, it is also possible to use an elastomer as the soft material and to combine said elastomer with a non-elastomeric polymer for the hard material.

A portion, cf. the reference numeral 23, coated with the hard material is provided at the bottom of the gate 13, said portion being an extension of the hard material in the guide grooves 14. The surface of the hard material is in the above portion 23 recessed by 2 to 4 mm relative to the surface of the surrounding soft material. As a result, a perceptible stop is obtained when the gate reaches its bottom position.

FIGS. 4 to 7 illustrate a modified embodiment of a gate 43 to be used in the valve body 1 of FIGS. 1 and 2. The gate of FIGS. 4 to 7 is structured substantially like the gate 13 and comprises a gate core 46 entirely, i.e. also on the inside, coated with a polymeric material. The gate is coated such that in the guide grooves 44 it is coated with a hard polymeric material 21 and over its remaining surface, including the radial and the axial sealing areas 58, 57, it is coated with a soft polymeric material 22, preferably an elastomer. The material combinations may be the same as described above. The valve gate 43 differs primarily from the valve gate 13 by both the gate core 46 and the coated gate comprising a groove 54 extending radially inwards and in the guide plane of the gate extending between the two guide grooves 44 in the lower portion of the gate. The resulting gate 43 comprises two mirror-symmetrical sealing areas, which not only seal against a flow through the valve but also seal off a cavity in the interior of the valve. In this manner an opening to the sealed cavity can be provided in the bottom of the valve body 1 with the result that it is possible to check whether the valve closes tightly, such as for instance by removing a plug placed in said opening or by means of a pressure sensor also placed in said opening. The opening has been indicated by means of the reference numeral 55 in FIG. 1. Each of the mirror-symmetrical sealing areas of the gate comprises an axial sealing area 57a and a radial sealing area 58a, said radial sealing areas 58a not being joined into a single continuous sealing area like the areas of the gate of FIGS. 1 and 2. As described above, portions coated with the hard material are provided in the radial sealing surface areas 58 of the gate, said portions being indicated by the reference numeral 53 and providing the perceptible stop when the gate reaches its bottom position during the closing of the valve.

According to the invention it is preferred to use a hard material of a hardness of approximately 90 shore and a soft material of a hardness of approximately 60 shore for both the valve gate 13 of FIGS. 1 to 3 and the valve gate 43 of FIGS. 4 to 7.

The invention may be modified in many ways without thereby deviating from the scope thereof. Thus the areas coated with the hard material are for instance not limited to the above, but may in addition to the guide groove areas be placed anywhere considered suitable, such as in the area receiving the stem nut so as to achieve a superior wearability.

I claim:

1. A method for the manufacture of a gate for a gate valve wherein said gate valve comprising a gate core provided with a coating thereon consisting essentially of a softer moulded elastomeric material and a harder elastomeric material provided at least in the guide grooves of the gate, comprising the steps of:
   (a) placing a gate core into a mould which is subsequently closed;
   (b) injecting a harder elastomeric material into the mould cavity through inlets in the portion corresponding to the guide grooves of the gate;
   (c) injecting a softer elastomeric material into the mould cavity; and
   (d) opening the mould and removing the gate valve.

2. The method according to claim 1 wherein the softer polymeric material is injected with a time delay of about 2 to 3 sec. relative to the injection of the harder polymeric material.

3. The method according to claim 1 wherein said gate core is coated with a binder before said gate core is placed in the mould.

4. A gate valve comprising a valve body and a gate displaceably arranged inside said valve body transverse to the flow direction, said gate provided on each side of said valve body with a guide groove guided by means of a mating guide rail formed on each side of the valve body, whereby the gate comprises a gate core provided with a coating thereon consisting essentially of a softer moulded elastomeric material which in the sealing surface areas of the gate sealing abuts the corresoonding seat surfaces of the valve body in the closed position of the gate, and a harder and more wear-resistant elastomeric material provided at least in the guide groove, wherein said harder material is moulded at least in the guide grooves, said softer and harder materials being molecularly compatible and molecularly interconnected in their transition areas.

5. The gate valve according to claim 4 wherein said bottom portion of said gate coated with the harder material is provided in the sealing surface areas of the gate and that the surface of the harder material is recessed relative to the surface of the surrounding softer material.

6. The gate valve according to claim 5 wherein the harder material is recessed by about 2 to about 4 mm.

7. The gate valve according to claim 5 wherein said harder material coated areas of the gate are continuous.

8. The gate valve according to claim 7 wherein said harder and softer polymeric coating materials are hard and soft nitrile rubber (NBR), respectively.

* * * * *

UNITED STATES PATENT AND TRADEMARK OFFICE
CERTIFICATE OF CORRECTION

PATENT NO. : 5,279,320
DATED : January 18, 1994
INVENTOR(S) : Erling Freudendahl It is certified that error appears in the above-indentified patent and that said Letters Patent is hereby corrected as shown below:

```
        Column 6, line 5, Claim 4:   "corresoonding"
should read --corresponding--
```

Signed and Sealed this

Second Day of August, 1994

Attest:

BRUCE LEHMAN

*Attesting Officer*     *Commissioner of Patents and Trademarks*